(12) United States Patent
Bulut et al.

(10) Patent No.: US 11,488,064 B2
(45) Date of Patent: Nov. 1, 2022

(54) MACHINE LEARNING MODEL FOR MICRO-SERVICE COMPLIANCE REQUIREMENTS

(71) Applicant: International Business Machines Corporation, Armonk, NY (US)

(72) Inventors: Muhammed Fatih Bulut, Ossining, NY (US); Jinho Hwang, Ossining, NY (US); Ali Kanso, Stamford, CT (US); Shripad Nadgowda, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 16/834,463

(22) Filed: Mar. 30, 2020

(65) Prior Publication Data
US 2021/0304063 A1 Sep. 30, 2021

(51) Int. Cl.
*G06N 20/00* (2019.01)
*G06F 9/22* (2006.01)
*G06N 5/04* (2006.01)
*G06K 9/62* (2022.01)

(52) U.S. Cl.
CPC ............ *G06N 20/00* (2019.01); *G06F 9/226* (2013.01); *G06N 5/04* (2013.01); *G06F 2212/465* (2013.01); *G06K 9/6256* (2013.01)

(58) Field of Classification Search
CPC ............ G06F 9/226; G06F 2212/465; G06F 11/1464; G06F 11/3428; G06F 9/54; G06K 9/6256; G06N 5/04; G06N 20/00; G06Q 40/04; G06Q 90/00; G16B 40/00; G16H 10/20; H04L 65/75; H04M 15/44
See application file for complete search history.

(56) References Cited

U.S. PATENT DOCUMENTS

| | | | |
|---|---|---|---|
| 9,052,939 B2 | 6/2015 | Ferris | |
| 9,692,632 B2 | 6/2017 | Bhattacharya et al. | |
| 10,171,310 B2 | 1/2019 | Hernandez et al. | |
| 2012/0004945 A1 | 1/2012 | Vaswani | |

(Continued)

OTHER PUBLICATIONS

Healthcare Aware Distributed Tracing. Using Machine Learning to Solve the Mystery of Tracing PHI Across Microservices. https://www.cleardata.com/wp-content/uploads/2019/03/Healthcare-Aware-Distributed-Tracing-Whitepaper.pdf, 2019.

(Continued)

*Primary Examiner* — Le H Luu
(74) *Attorney, Agent, or Firm* — Lieberman & Brandsdorfer, LLC

(57) ABSTRACT

Embodiments relate to a computer system, computer program product, and computer-implemented method to train a machine learning (ML) model using artificial intelligence to learn an association between (regulatory) compliance requirements and features of micro-service training datasets. The trained ML model is leveraged to determine the compliance requirements of a micro-service requiring classification. In an exemplary embodiment, once the micro-service has been classified with respect to applicable compliance requirements, the classified micro-service may be used as an additional micro-service training dataset to further train the ML model and thereby improve its performance.

19 Claims, 8 Drawing Sheets

(56) References Cited

U.S. PATENT DOCUMENTS

| | | | |
|---|---|---|---|
| 2017/0243028 A1 | 8/2017 | LaFever et al. | |
| 2019/0303541 A1 | 10/2019 | Reddy et al. | |
| 2019/0354809 A1* | 11/2019 | Ralhan | G06Q 90/00 |
| 2020/0120000 A1* | 4/2020 | Parthasarathy | G06F 11/3428 |
| 2020/0220939 A1* | 7/2020 | Lawson | H04M 15/44 |
| 2020/0287984 A1* | 9/2020 | Walsh | H04L 65/75 |
| 2020/0310888 A1* | 10/2020 | Gopalan | G06F 9/54 |
| 2020/0344233 A1* | 10/2020 | Lai | G06Q 40/04 |
| 2021/0064480 A1* | 3/2021 | Krojzl | G06F 11/1464 |
| 2021/0090694 A1* | 3/2021 | Colley | G16B 40/00 |
| 2021/0110286 A1* | 4/2021 | Hewitt | G06N 5/04 |
| 2021/0240853 A1* | 8/2021 | Carlson | G16H 10/20 |

OTHER PUBLICATIONS

Joshi, Naveen, "Why Regulatory Compliance Can Be Complicated And How AI Can Simplify It", https://www.forbes.com/sites/cognitiveworld/2019/07/22/why-regulatory-compliance-can-be-complicated-and-how-ai-can-simplify-it/, Jul. 22, 2019.

Shahid, W., et al., "Regulatory Compliance in the Age of Artificial Intelligence", https://ankura.com/insights/regulatory-compliance-in-the-age-of-artificial-intelligence/, Jun. 27, 2018.

\* cited by examiner

MACHINE LEARNING MODEL FOR MICRO-SERVICE COMPLIANCE REQUIREMENTS

BACKGROUND

The present embodiments relate to training a machine learning (ML) model to identify compliance requirements using one or more micro-service training datasets, and leveraging the trained ML model to identify applicable compliance requirements for a micro-service, particularly in connection with but not limited to a modernization process, such as breaking down a monolithic application into micro-services and migrating to a cloud environment.

Application modernization involves taking existing legacy applications and modernizing their platform infrastructure, internal architecture, and/or features. Much of the discussion around application modernization focuses on monolithic, on-premises applications. One aspect of modernization involves moving a monolithic application from on-premises infrastructure to remote shared infrastructure, also referred to as the "cloud." Another aspect involves modernizing the monolithic applications to a micro-services architecture. Generally, micro-services are an architectural approach, often cloud native, in which a single application is composed of multiple loosely coupled and independently deployable smaller components or services, referred to as micro-services. The micro-services typically (but not necessarily) have their own stack, inclusive of a database and data model, communicate with one another over a combination of representational state transfer (REST) application programming interfaces (APIs), and are organized by business capability.

An under-addressed problem relating to modernization involves compliance requirements, including but not limited to governmental regulatory compliance requirements and industry standards. Examples of regulations and standards providing compliance requirements include General Data Protection Regulations (GDPR), the Family Educational Rights and Privacy Act (FERPA), the Health Insurance Portability and Accountability Act (HIPAA), the Federal Financial Institutions Examination Council (FFIEC), the Payment Card Industry Data Security Standard (PCI DSS), the Federal Information Security Management Act (FISMA), Information Security Management Systems (ISMS) standards such as the ISO/IEC 27000 series, Security Technical Implementation Guides (STIGs), and the Center for Internet Security (CIS) benchmarks.

One solution for addressing compliance requirements is to modernize all micro-services to satisfy all compliance requirements, irrespective of whether or not the compliance requirements are applicable to each of the micro-services. A drawback to this approach is the cost and labor involved in comporting all micro-services to such a set of universal compliance requirements.

SUMMARY

The embodiments include a computer system, a computer program product, and a computer-implemented method for training a machine learning (ML) model and leveraging the ML model to identify compliance requirements corresponding to one or more micro-services.

In one aspect, a computer system is provided with a processing unit operatively coupled to memory and an artificial intelligence (AI) platform in communication with the processing unit. The AI platform includes a machine learning (ML) manager and a classifier. The ML manager is configured to train a machine learning (ML) model to learn an association between one or more compliance requirements and one or more features of one or more micro-service training datasets. The classifier is configured to leverage the trained ML model to determine compliance requirements for a micro-service. The classifier is configured to receive the micro-service, extract one or more features from the received micro-service, and apply the one or more features extracted from the received micro-service to the trained ML model. The trained ML model predicts an association between the micro-service and one or more of the compliance requirements based on correlation of the one or more features extracted from the micro-service and one or more features of the one or more micro-service training datasets.

In another aspect, a computer program product is provided with a computer readable storage medium having a program code embodied therewith. The program code is executable by a processor to train a machine learning (ML) model to learn an association between one or more compliance requirements and one or more features of one or more micro-service training datasets. The program code is further executable by the processor to leverage the trained ML model to extract one or more features from the received micro-service, and apply the one or more features extracted from the received micro-service to the trained ML model. The program code is executable to leverage the trained ML model to predict an association between the micro-service and one or more of the compliance requirements based on correlation of the one or more features extracted from the micro-service and one or more features of the one or more micro-service training datasets.

In yet another aspect, a computer-implemented method is provided to train a machine learning (ML) model using artificial intelligence. The ML model learns an association between one or more compliance requirements and one or more features of one or more micro-service training datasets. The method further includes receiving a micro-service, extracting one or more features from the received micro-service, and applying the one or more features extracted from the received micro-service to the trained ML model. The trained ML model is leveraged to determine compliance requirements for the micro-service, including the ML model predicting an association between the micro-service and one or more of the compliance requirements based on correlation of the one or more features extracted from the micro-service and one or more features of the one or more micro-service training datasets.

These and other aspects, features and advantages will become apparent from the following detailed description of the exemplary embodiments, taken in conjunction with the accompanying drawings.

BRIEF DESCRIPTION OF THE SEVERAL VIEWS OF THE DRAWINGS

The drawings referenced herein form a part of the specification and are incorporated herein. Features shown in the drawings are meant as illustrative of only some embodiments, and not of all embodiments, unless otherwise explicitly indicated.

DETAILED DESCRIPTION

Figure 1:
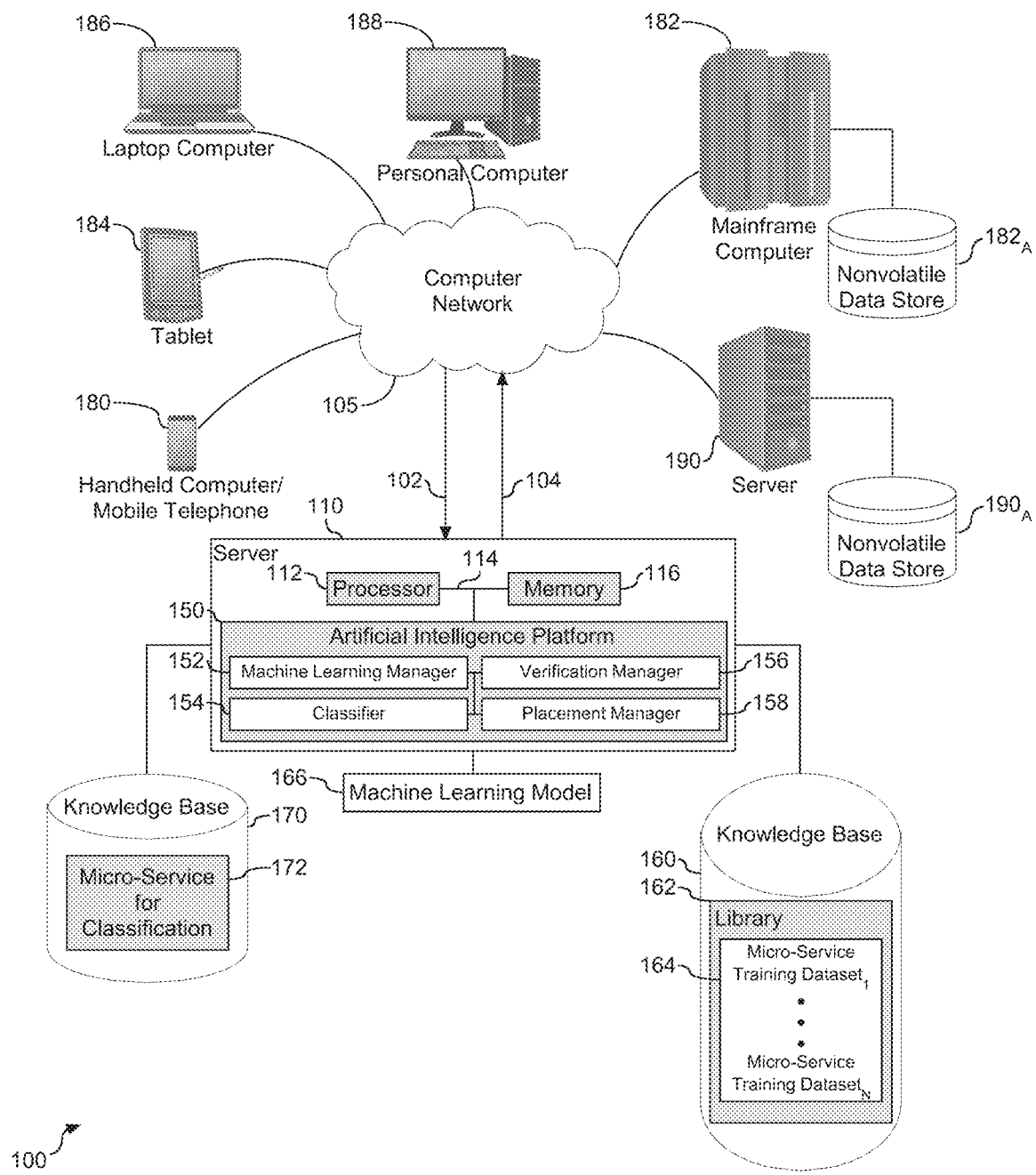
FIG. 1 depicts a system diagram illustrating a computer system with an embodied artificial intelligence platform.

It will be readily understood that the components of the present embodiments, as generally described and illustrated in the Figures herein, may be arranged and designed in a wide variety of different configurations. Thus, the following details description of the embodiments of the computer system, method, and computer program product of the present embodiments, as presented in the Figures, is not intended to limit the scope of the embodiments, as claimed, but is merely representative of selected embodiments.

Reference throughout this specification to "a select embodiment," "one embodiment," or "an embodiment" means that a particular feature, structure, or characteristic described in connection with the embodiment is included in at least one embodiment. Thus, appearances of the phrases "a select embodiment," "in one embodiment," or "in an embodiment" in various places throughout this specification are not necessarily referring to the same embodiment. The various embodiments may be combined with one another.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

An intelligent system is provided with tools and algorithms to run intelligent real-time analytics using Machine Learning (ML), which is a subset of Artificial intelligence (AI). AI relates to the field of computer science directed at computers and computer behavior as related to humans. AI refers to the intelligence when machines, based on information, are able to make decisions, which, for example, improves or maximizes the chance of success in a given topic. More specifically, AI is able to learn from a dataset to solve problems and provide relevant recommendations. For example, in the field of artificially intelligent computer systems, natural language systems (such as the IBM Watson® artificially intelligent computer system) process natural language based on system acquired knowledge. To process natural language, the system may be trained with data derived from a database or corpus of knowledge, but the resulting outcome can be incorrect or inaccurate for a variety of reasons.

At the core of AI and associated reasoning lies the concept of similarity. The process of understanding natural language and objects requires reasoning from a relational perspective that can be challenging. Structures, including static structures and dynamic structures, dictate a determined output or action for a given determinate input. More specifically, the determined output or action is based on an express or inherent relationship within the structure. This arrangement may be satisfactory for select circumstances and conditions. However, it is understood that dynamic structures are inherently subject to change, and the output or action may be subject to change accordingly.

ML, which as noted above is a sub-set of AI, utilizes algorithms to learn from data, rather than through explicit programming, and create foresights based on this data. A ML model is the output generated when you train a ML algorithm with data. Deep learning is a type of ML in which systems can accomplish complex tasks by using multiple layers of choices based on output of a previous layer, creating increasingly smarter and more abstract conclusions.

Exemplary embodiments described herein involve training a ML model to identify compliance requirements, e.g., applicable regulatory requirements and/or industry standards, using micro-service training datasets, and utilizing the trained ML model to identify compliance requirements for one or more micro-services, particularly in connection with a modernization process such as conversion of an on-premises (or off-premises) monolithic application to a cloud environment or developing a new micro-service based architecture where a monolithic application is absent. It is understood in the art that a monolithic application is a self-contained application independent from other applications. Micro-services or a micro-service architecture typically refer to a computer environment in which an application is built as a suite of modular components or services based on function definitions, each corresponding to one function definition, and each running in its own process and communicating by a way of lightweight mechanisms. In certain micro-service architecture, data is stored outside of the service, and as such the service is stateless. The services or components are commonly referred to as "atomic services." Each atomic service is a lightweight component for independently performing a modular service. For example, an atomic service might receive and combine keywords, process an algorithm, or make a decision based on the result of algorithm processing. Each module supports a specific task and uses a defined interface, such as an application programming interface (API) to communicate with other services. The micro-service architecture supports and enables scalability in a hybrid network.

Referring to FIG. 1, a schematic diagram of an artificial intelligence platform computing system (100) is depicted. As shown, a server (110) is provided in communication with a plurality of computing devices (180), (182), (184), (186), (188), and (190) across a network connection (105). The server (110) is configured with a processing unit, e.g., processor, (112) in communication with memory (116) across a bus (114). The server (110) is shown with an artificial intelligence (AI) platform (150) for building a machine learning model, running the model, and applying active learning to the model over the network (105) from one or more of the computing devices (180), (182), (184), (186), (188), and (190). More specifically, the computing devices (180), (182), (184), (186), (188), and (190) communicate with each other and with other devices or components via one or more wired and/or wireless data communication links, where each communication link may comprise one or more of wires, routers, switches, transmitters, receivers, or the like. In this networked arrangement, the server (110) and the network connection (105) enable communication detection, recognition, and resolution. Other embodiments of the server (110) may be used with components, systems, subsystems, and/or devices other than those that are depicted herein.

The AI platform (150) is shown herein configured with tools to build a ML model (166) that can identify compliance requirements for micro-services. The tools include, but are not limited to, a machine learning (ML) manager (152), a classifier (154), a verification manager (156), and a placement manager (158). Although the verification manager (156) and the placement manager (158) are illustrated in FIG. 1 as embedded in the AI platform (150), in other embodiments the tools (156) and (158) may be apart or external from the AI platform (150).

The AI platform (150) may receive input from the network (105) and leverage a data source (160), also referred to herein as a corpus or knowledge base, to train the ML model (166). As shown, the data source (160) is configured with one or more micro-service training datasets (162). Each micro-service training dataset (162) may include one or more features and one or more compliance requirements associated with a micro-service. In an embodiment, the data source (160) may be configured with other or additional sources of input, and as such, the sources of input shown and described herein should not be considered limiting. Similarly, in an embodiment, the data source (160) includes structured, semi-structured, and/or unstructured content in a plurality of documents that are contained in one or more databases or corpus. The various computing devices (180), (182), (184), (186), (188), and (190) in communication with the network (105) may include access points for logically grouped documents. Some of the computing devices may include devices for a database storing the corpus of data as the body of information used by the AI platform (150) to generate response output (104), and to communicate the response output (104) to a corresponding network device architecture operatively coupled to the server (110) or one or more of the computing devices (180), (182), (184), (186), (188), and (190) across the computer network (105).

The network (105) may include local network connections and remote connections in various embodiments, such that the AI platform (150) may operate in environments of any size, including local and global, e.g., the Internet. Additionally, the AI platform (150) serves as a front-end system that can make available a variety of knowledge extracted from or represented in network accessible sources and/or structured data sources. In this manner, some processes populate the AI platform (150), with the AI platform (150) also including input interfaces to receive requests and respond accordingly.

The knowledge base (160) may be populated with one or more libraries, such as library (162), with each library (e.g., (162)) populated with one or more training datasets (164), such as Micro-Service Training Dataset$_1$, . . . Micro-Service Training Dataset$_N$. Although only one library and two training datasets are shown, these quantities should not be considered limiting. Micro-service training datasets may be logically grouped into libraries for use as part of the corpus (160) of data with the AI platform (150). The corpus (160) may include structured and unstructured source of data for use by the AI platform (150). The AI platform (150) may effectively train a ML model (166) by leveraging the data source (160), which in an embodiment may be operatively coupled to the server (110) across the network (105).

The machine learning (ML) manager (152) is shown herein embedded in the AI platform (150). In an embodiment, the ML manager (152) trains a ML model (166), shown herein operatively coupled to the dataset (164). According to an embodiment, the ML model (166) is trained for regulation requirement detection. The following pseudo code demonstrates the ML model training undertaken by the ML manager:

---

Input: Previously submitted micro-services $m_i$ and their associated
  regulationrequirement $R_i$;
  For each $(m_i, R_i)$ tuple
    Extract features $f_i$ for training;
    Store $f_i$ as a feature vector in list X
    Store $R_i$ in vector Y
  Train a machine learning model using X as input Y as output

---

The ML model (166) learns a correlation between features, $f_i$, and requirements, $R_i$. In an embodiment, the ML model is training with a supervised learning algorithm, such as a Support Vector Machine (SVM). In another embodiment, the ML model comprises one or more Decision Trees. In still another embodiment, the ML model comprises one or more Neural Networks or Deep Neural Networks.

The ML manager (152) is configured to train a ML model by accessing the knowledge base (160) to receive one or more micro-service training datasets (162). In an exemplary embodiment, each of the micro-service training datasets (162) is associated with one or more features and one or more compliance requirements, the accuracy of which has been verified prior to being received by the ML manager (152). For each of the micro-service training datasets, the ML manager (152) is configured to train the ML model (166) to capture the one or more compliance requirements and extract the one or more features.

In an exemplary embodiment, a plurality of micro-service training datasets $(m_1, m_2, m_3, \ldots, m_n)$ and their respective compliance requirements, e.g., regulations ($\{R_{11}, R_{12}, \ldots, R_{1u}\}$ for $m_1$, $\{R_{21}, R_{22}, \ldots, R_{2v}\}$ for $m_2$, . . . , $\{R_{n1}, R_{n2}, \ldots, R_{n,w}\}$ for $m_n$) are received from the knowledge base (160). This embodiment employs a quantity "n" micro-service training datasets; however, it should be understood that "n" may be any integer greater than 1. In this embodiment, the micro-service training datasets $(m_i)$ have multiple corresponding regulations 1 through "u", "v", and "w", respectively. It should be understood that the quantity of regulations or compliance requirements $(R_i)$ corresponding to each of the micro-service training datasets $(m_1, m_2, m_3, \ldots, m_n)$ may be singular or plural, and may be the same as or different than one another for the various micro-service training datasets (e.g., "u", "v", and "w" may be equal to one another or different than one another), assuming more than one micro-service training dataset, i.e., that "n" is greater than one (1). In an embodiment, the ML manager (152) determines a relationship between the micro-service training datasets and the regulations. For example, for micro-service training dataset $m_i$, the capture of compliance requirements may be output as $\{0, 1, 0, 0\}$ for regulations $\{R_1, R_2, R_3, R_4\}$, wherein zero (0) is a negative association and one (1) is a positive association.

The ML manager (152) is further configured to train the ML model to extract one or more features from the one or more micro-service training datasets. In an embodiment, the one or more extracted features of each micro-service comprise a service description, a service code, a service configuration, database accessibility, associated application programming interface, input(s) and output(s) of its application programming interface, or a combination comprising one or more thereof. The ML manager (152) is configured to train the ML model to associate the extracted one or more features with the captured one or more compliance requirements of the same micro-service training dataset. The association between the captured one or more compliance requirements and the extracted one or more features of the micro-service training dataset is learned by the ML model, thereby causing the ML model to be trained. Generally, the greater the quantity of accurate micro-service training datasets, the better the training of the ML model.

The classifier (154) is also shown herein embedded in the AI platform (150). The classifier (154) is configured to leverage the ML model trained by the ML manager (152) to determine compliance requirements, e.g., for incorporation of a micro-service into an application modernization. In an embodiment, the classifier (154) accesses the knowledge base (170) to receive a micro-service (172) in need of compliance requirement classification. The knowledge base (170) can include one or more micro-services (172) in need of classification. While knowledge bases (160) and (170) are shown as separate, it should be understood that the knowledge bases (160) and (170) may be a single knowledge base. Similarly, additional knowledge bases (not shown) may be accessed to receive additional micro-service training datasets (164) and micro-services for classification (172).

The classifier (154) extracts one or more features from the received micro-service (172). In an embodiment, the one or more extracted features of the micro-service (172) comprise a service description, a service code, a service configuration, database accessibility, associated application programming interface, or a combination comprising one or more thereof. The classifier (154) is configured to apply the one or more features extracted from the received micro-service (172) to the trained ML model (166) to predict an association between the micro-service (172) and one or more of the compliance requirements based on correlation of the one or more features extracted from the micro-service (172) and one or more features extracted from the one or more micro-service training datasets (162).

The verification manager (156) is also shown herein embedded in the AI platform (150) in accordance with an embodiment, and operatively coupled to the machine learning model (166) to automate verification. According to other embodiments, the functions performed by the verification manager (156) may be confirmed by a subject matter expert (SME), and fed back to the ML model (166) for active learning. In an embodiment, the verification manager (156) verifies the accuracy of the prediction made by the classifier (154).

In an embodiment, subject to verification of the accuracy of the prediction of compliance requirements for the micro-service by the verification manager (156), the ML manager (152) can further train the ML model (166) using the micro-service and its verified compliance requirements. This updating to the training of the ML model is explained in further detail below with reference to FIG. 5. In an embodiment, the updated trained ML model is then leveraged with respect to subsequently processed micro-services, such as micro-services (172) from knowledge base (170).

Selective verification using the verification manager (156) includes discriminatingly evaluating the prediction. In an embodiment, the evaluation may be an acceptance or rejection of the prediction. An acceptance may be accompanied with an explanation for acceptance, and similarly a rejection may be accompanied by an explanation for a corresponding rejection. For an accepted prediction, the micro-service and its predicted compliance requirements are passed on to the placement manager (158). For a rejected prediction, the micro-service and its predicted compliance requirement are not passed on to the placement manager (158), but are subject to further consideration for determining applicable compliance requirements. Such further consideration may be by a subject matter expert (SME). Once the SME has manually identified the corresponding compliance regulations for the micro-service, the micro-service and its manually identified compliance regulations can be passed on to the placement manager (158), and back into the model (166) for active learning.

The placement manager (158) is also shown herein embedded in the AI platform (150) in accordance with an embodiment such that placement is carried out dynamically or automatically based on output from the machine learning model (166). In an embodiment, once the requirements of a micro-service are determined, in an IT environment where the compliance requirements are known, automation can place the micro-service into its suitable placement. According to another embodiment, the functions performed by the placement manager (158) may be performed confirmed by a subject matter expert (SME). In an embodiment, the placement manager (158) is configured identify a placement location of the micro-service within an information technology infrastructure and to support automatic placement of the micro-service. For example, in one embodiment, the placement manager (158) physically modifies a physical aspect of a hardware device to support and enable the placement of the micro-service. The placement is selected to satisfy operating protocols, and in an embodiment physical hardware protocols, of the one or more compliance requirements associated with the micro-service. In a further embodiment, the placement manager (158) is further configured to place the micro-service into the identified placement location. In an exemplary embodiment, the identified placement is a remote computing device, such as a cloud server or servers.

Compliance classification requests received across the network (105) may be processed by a server (110), for example IBM Watson® server, and the corresponding artificial intelligence (AI) platform (150). As shown herein, the AI platform (150) together with the embedded tools (152), (154), (156), and (158) trains the ML model (166), as well as leverages the trained ML model to classify one or more micro-services with respect to applicable compliance requirements, such as regulations and/or industry standards. In an exemplary embodiment, the function of the system is to establish a regulatory compliant micro-service, and in particularly exemplary embodiments to establish regulator compliant micro-services of a micro-service based architecture.

In some illustrative embodiments, server (110) may be the IBM Watson® system available from International Business Machines Corporation of Armonk, N.Y., which is augmented with the mechanisms of the illustrative embodiments described hereafter. The IBM Watson® system may receive or detect a micro-service compliance classification request as input content (102), which the Watson® system then analyzes to identify applicable compliance requirements corresponding to the micro-service.

The managers (152), (154), (156), and (158), hereinafter referred to collectively as AI tools, are shown embodied in or integrated within the AI platform (150) of the server (110). The AI tools may be implemented in a separate computing system (e.g., 190), or in an embodiment a system or systems, can they be implemented in two or more connected across network (105) to the server (110). Wherever embodied, the AI tools (152), (154), (156), and (158) function to train a ML model and leverage the ML model to classify one or more micro-services with respect to applicable compliance requirements.

Types of devices and corresponding systems that can utilize the AI platform (150) range from small handheld devices, such as handheld computer/mobile telephone (180) to large mainframe systems, such as mainframe computer (182). Examples of handheld computer (180) include personal digital assistants (PDAs), personal entertainment devices, such as MP4 players, portable televisions, and compact disc players. Other examples of information handling systems include pen, or tablet computer (184), laptop, or notebook computer (186), personal computer system (188), and server (190). As shown, the various devices and systems can be networked together using computer network (105). Types of computer network (105) that can be used to interconnect the various devices and systems include Local Area Networks (LANs), Wireless Local Area Networks (WLANs), the Internet, the Public Switched Telephone Network (PSTN), other wireless networks, and any other network topology that can be used to interconnect the devices and systems. Many of the devices and systems include nonvolatile data stores, such as hard drives and/or nonvolatile memory. Some of the devices and systems may use separate nonvolatile data stores (e.g., server (190) utilizes nonvolatile data store (190a), and mainframe computer (182) utilizes nonvolatile data store (182a)). The nonvolatile data store (182a) can be a component that is external to the various devices and systems or can be internal to one of the devices and systems.

The device(s) and system(s) employed to support the artificial intelligence platform (150) may take many forms, some of which are shown in FIG. 1. For example, an information handling system may take the form of a desktop, server, portable, laptop, notebook, or other form factor computer or data processing system. In addition, the device(s) and system(s) may take other form factors such as a personal digital assistant (PDA), a gaming device, ATM machine, a portable telephone device, a communication device, or other devices that include a processor and memory.

Figure 2:
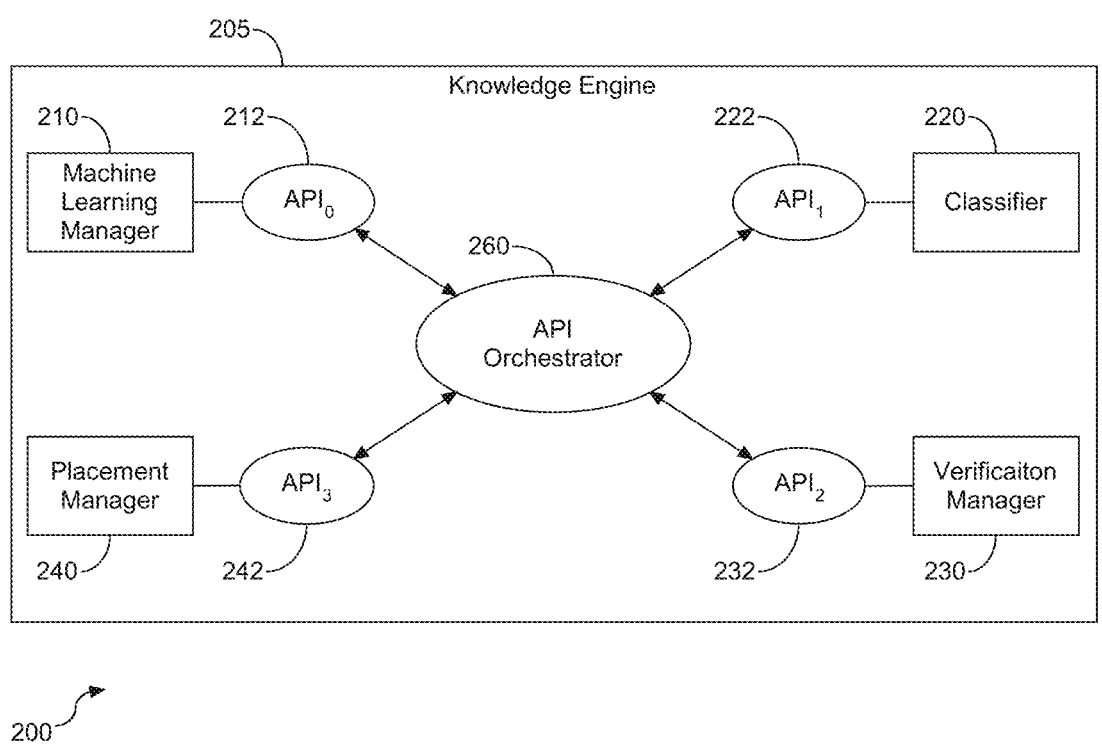
FIG. 2 depicts a block diagram illustrating the artificial intelligence platform tools, as shown and described in FIG. 1, and their associated application program interfaces.

An Application Program Interface (API) is understood in the art as a software intermediary between two or more applications. With respect to the AI platform (150) shown and described in FIG. 1, one or more APIs may be utilized to support one or more of the tools (152), (154), (156) and (158) and their associated functionality. Referring to FIG. 2, a block diagram (200) is provided illustrating the tools (152), (154), (156), and (158) and their associated APIs. As shown, a plurality of tools is embedded within the knowledge engine (205), with the tools including the machine learning (ML) manager (152) shown in FIG. 2 as (210) associated with $API_0$ (212), the classifier (154) shown in FIG. 2 as (220) associated with $API_1$ (222), the verification manager (156) shown in FIG. 2 as (230) associated with $API_2$ (232), and the placement manager (158) shown in FIG. 2 as (240) associated with $API_3$ (242). Each of the APIs may be implemented in one or more languages and interface specifications. $API_0$ (212) provides functional support to train a ML model by analyzing a plurality of micro-service training datasets and learning a correlation between captured compliance requirements and extracted features; $API_1$ (222) provides functional support to leverage the trained ML model to predict one or more compliance requirements for a micro-service; $API_2$ (232) provides functional support to verify the prediction made by leveraging the trained ML model; and $API_3$ (242) provides functional support to identify a placement location of the at least one micro-service within an information technology infrastructure. As shown, each of the APIs (212), (222), (232), and (242) are operatively coupled to an API orchestrator (260), otherwise known as an orchestration layer, which is understood in the art to function as an abstraction layer to transparently thread together the separate APIs. In an embodiment, the functionality of the separate APIs may be joined or combined. As such, the configuration of the APIs shown herein should not be considered limiting. Accordingly, as shown herein, the functionality of the tools may be embodied or supported by their respective APIs.

Figure 3:
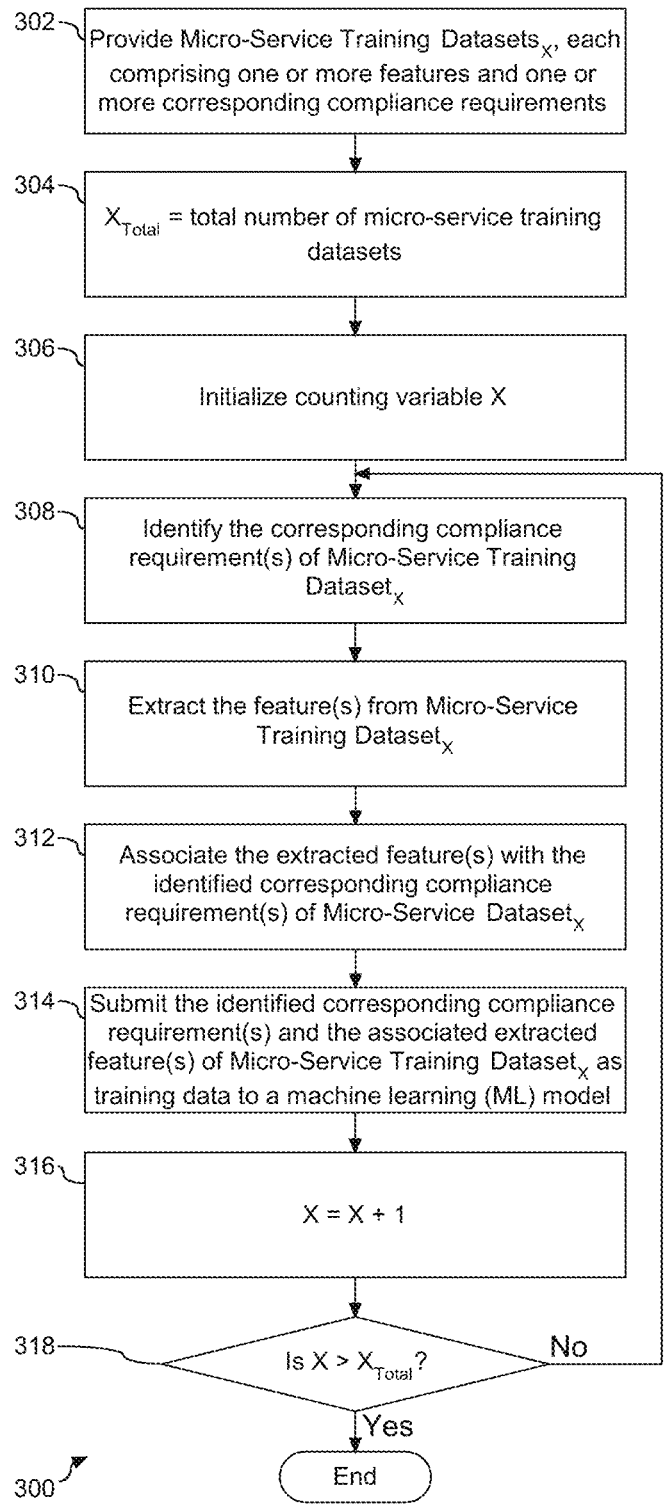
FIG. 3 depicts a flowchart illustrating a process for training a machine learning model using micro-service training datasets to identify compliance requirements for micro-services.

Referring to FIG. 3, a flowchart (300) is provided illustrating a process for training a machine learning (ML) model using one or more micro-service training datasets to identify compliance requirements for micro-services, such as micro-services (172) of the knowledge base (170). As shown, a plurality of Micro-Service Training Datasets$_X$, each comprising one or more features and one or more corresponding compliance requirements, is provided (302). In an embodiment, the Micro-Service Training Datasets$_X$ are previously verified micro-services and their associated regulation requirements, including information from which features can be extracted. The features may include, for example, a service description, a service code, a service configuration, database accessibility, associated application programming interface, or a combination comprising one or more thereof.

The variable X is employed in FIG. 3 to represent a micro-service training dataset counting variable for micro-service training datasets contained in a corpus or knowledge base, e.g., the micro-service training dataset(s) (164) of the knowledge base (160) of FIG. 1. Following step (302), the quantity of micro-service training datasets in the corpus or knowledge base is assigned to the variable $X_{Total}$ (304), and a corresponding micro-service training dataset counting variable is initialized (306).

For the initial micro-service training dataset, i.e., Micro-Service Training Dataset$_0$, one or more compliance requirements corresponding to the micro-service training dataset are identified in step (308). One or more features of the first micro-service training dataset, e.g., Micro-Service Training Dataset$_0$, are extracted in step (310). In step (312), the one or more features extracted in step (310) are associated with the one or more compliance requirements identified in step (308). The one or more identified corresponding compliance requirements and the one or more associated extracted features of the first micro-service training dataset, i.e., Micro-Service Training Dataset$_0$, are submitted as training data to an embedded algorithm of the ML model in step (314).

After the training data are submitted to the ML model in step (314), the micro-service training dataset counting variable X is incremented (316). Thereafter, a decision is made whether the training dataset counting variable X is greater than the total number of micro-service training datasets $X_{Total}$ in step (318). If the decision in step (318) is in the negative, the flowchart returns to step (308), and steps (308), (310), (312), and (314) are repeated, e.g., for Micro-Service Training Dataset$_1$ and so on. However, if the decision at step (318) is positive, then the method of the flowchart (300) concludes. Accordingly, as shown herein the ML model (166) is trained with an association between the one or more features extracted from the micro-service training dataset and one or more identified compliance requirements.

Figure 4:
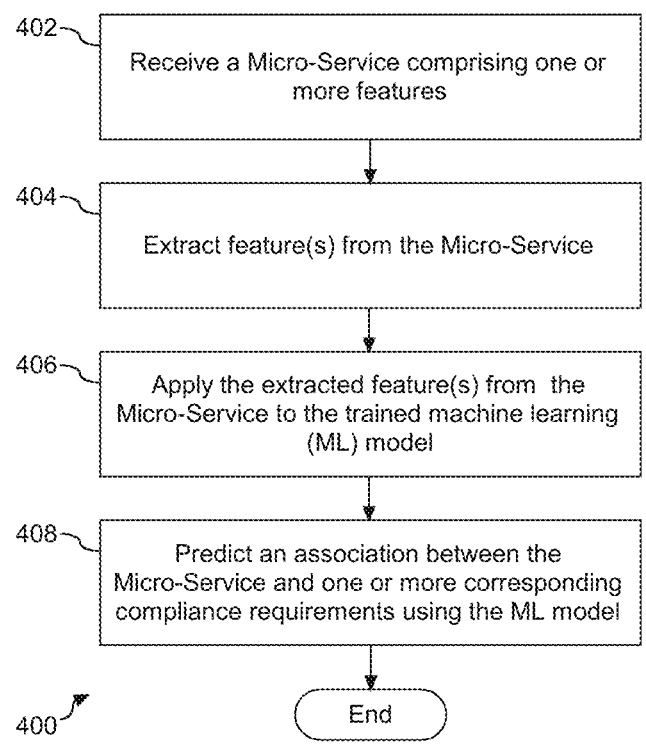
FIG. 4 depicts a flowchart illustrating a process for leveraging a trained machine learning model to identify compliance requirements for a micro-service.

Referring to FIG. 4, a flowchart (400) is provided illustrating a process for leveraging the trained machine learning (ML) model to determine compliance requirements for one or more micro-services, e.g., for incorporation of the micro-service(s) into application modernization. In an embodiment, application modernization may involve switching from a monolithic application to a micro-service based architecture. In another embodiment, application modernization may involve preparing a micro-service based architecture where a monolithic application did not exist.

In step (402), a micro-service comprising one or more features is received. One or more features are extracted from the micro-service (404). According to an exemplary embodiment, such extraction is carried out employing natural language processing (NLP) convert text input such as description into a numerical representation. Representative techniques include one-hot encoding, word embedding, and language modeling. In an exemplary embodiment, the feature(s) comprise a service description, a service code, a service configuration, database accessibility, associated application programming interface, or a combination comprising one or more thereof. The feature or features extracted from the micro-service are applied to the trained ML model (406). The trained ML model predicts an association between the micro-service and one or more of the compliance requirements (from the micro-services training datasets) based on correlation of the one or more features extracted from the micro-service and one or more features extracted from the one or more micro-service training datasets (408). In an embodiment, where the features of the micro-service match the features of a micro-service training dataset, the micro-service is predicted to be associated with the same compliance requirements as that micro-service training dataset. Although the flowchart (400) of FIG. 4 shows the processing of a micro-service, it should be understood that a plurality of micro-services may be processed. The processing of the plurality of micro-services may take place concurrently or consecutively. In an exemplary embodiment, the micro-services are processed consecutively, with each validated micro-service being used to further train the ML model before the next micro-service is processed. Validation and further ML model training are described below with reference to FIG. 5.

Figure 5:
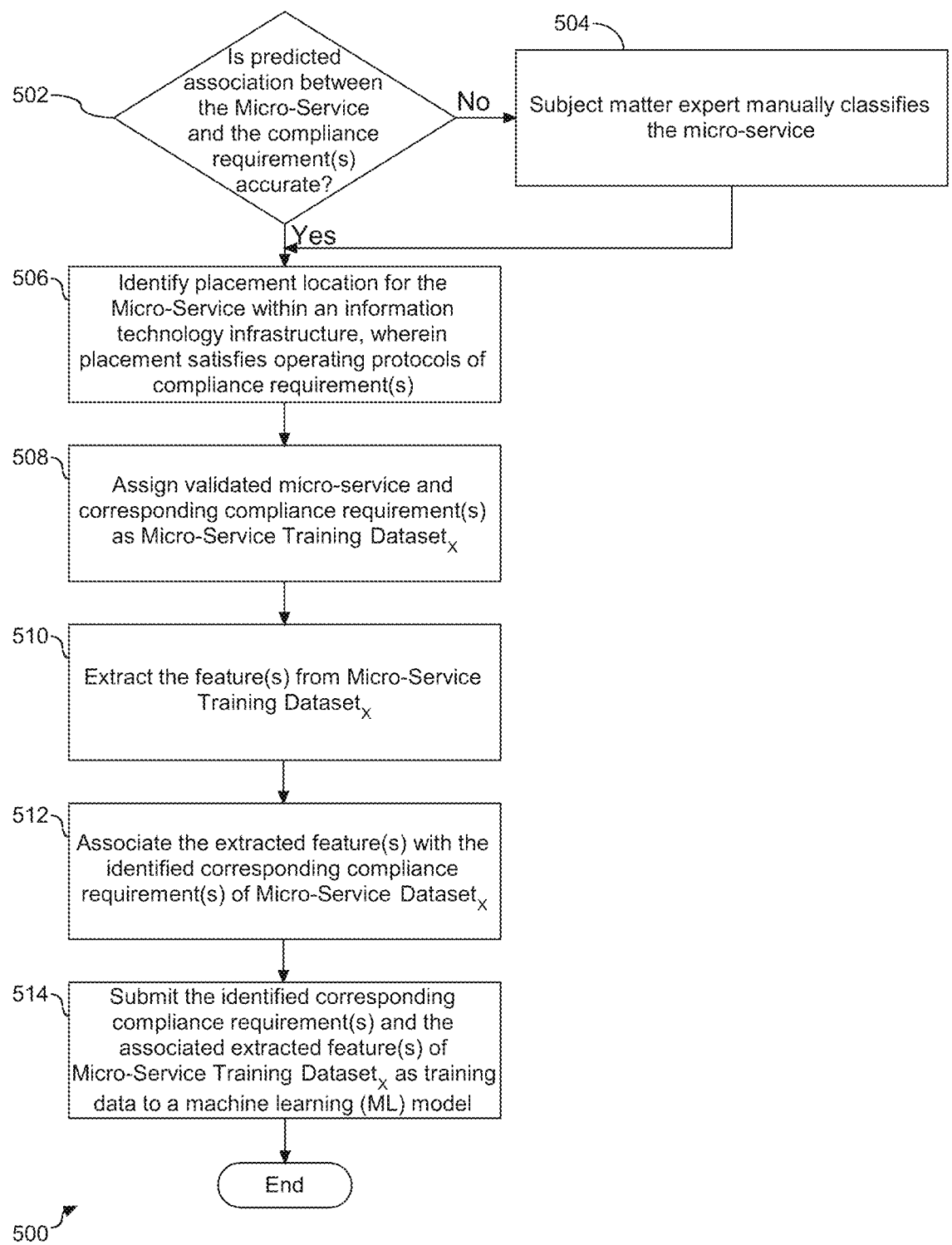
FIG. 5 depicts a flowchart illustrating a process for verification of compliance requirements with respect to a micro-service, placement of the micro-service within an information technology infrastructure, and further training of a machine learning model using the micro-service and its verified compliance requirements.

FIG. 5 provides a flowchart (500) showing validation and placement of, and further training of the ML model using, the micro-service and its predicted compliance requirements. In step (502), the predicted association between the micro-service and the one or more compliance requirements determined using the flowchart (400) of FIG. 4 is validated for accuracy. Validation may leverage a subject matter expert (SME) or a plurality (e.g., a panel) of SMEs into the active learning. Alternatively, validation can take place dynamically, including using the AI platform in an embodiment, such as leveraging a trained machine learning model as a validation platform. If the validation (502) is answered in the negative, i.e., a determination that the predication is not accurate, one or more SMEs manually classify the micro-service to identify one or more corresponding compliance requirements (504) and then proceeds to step (506), discussed below. On the other hand, if the validation (502) is answered in the positive, i.e., a determination that the predication is accurate, the process proceeds to step (506). In step (506), a placement location for the micro-service within an information technology infrastructure, such as but not limited to a cloud server or servers, is determined. The placement location satisfies the operating protocols of the compliance requirement(s).

In steps (508), (510), (512), and (514), the validated micro-service and its associated compliance requirements are used as a micro-service training set to further train the ML model. In step (508), the validated micro-service and its associated compliance requirements are assigned as a Micro-Service Training Dataset$_N$, which in one embodiment "N" will be $X_{Total}$ (FIG. 3) plus one. One or more features are extracted from the Micro-Service Training Dataset$_N$ (510), and the one or more extracted features are associated with one or more corresponding compliance requirements of Micro-Service Training Dataset$_N$ (512). The one or more extracted features and the one or more corresponding compliance requirements are submitted as training data to the ML model to further train the ML model (514).

Embodiments shown and described herein may be in the form of a computer system for use with an intelligent computer platform for training a machine learning model and utilizing the same to identify compliance requirements for micro-services. Aspects of the tools and managers, e.g., (152), (154), (156), (158), and their associated functionality may be embodied in a computer system/server in a single location, or in an embodiment, may be configured in a cloud-based system sharing computing resources. With references to FIG. 6, a block diagram (600) is provided illustrating an example of a computer system/server (602), hereinafter referred to as a host (602) in communication with a cloud based support system, to implement the processes described above with respect to FIGS. 3-5. Host (602) is operational with numerous other general purpose or special purpose computing system environments or configurations. Examples of well-known computing systems, environments, and/or configurations that may be suitable for use with host (602) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host (602) may be described in the general context of computer system-executable instructions, such as program modules, being executed by a computer system. Generally, program modules may include routines, programs, objects, components, logic, data structures, and so on that perform particular tasks or implement particular abstract data types. Host (602) may be practiced in distributed cloud computing environments where tasks are performed by remote processing devices that are linked through a communications network. In a distributed cloud computing environment, program modules may be located in both local and remote computer system storage media including memory storage devices.

Figure 6:
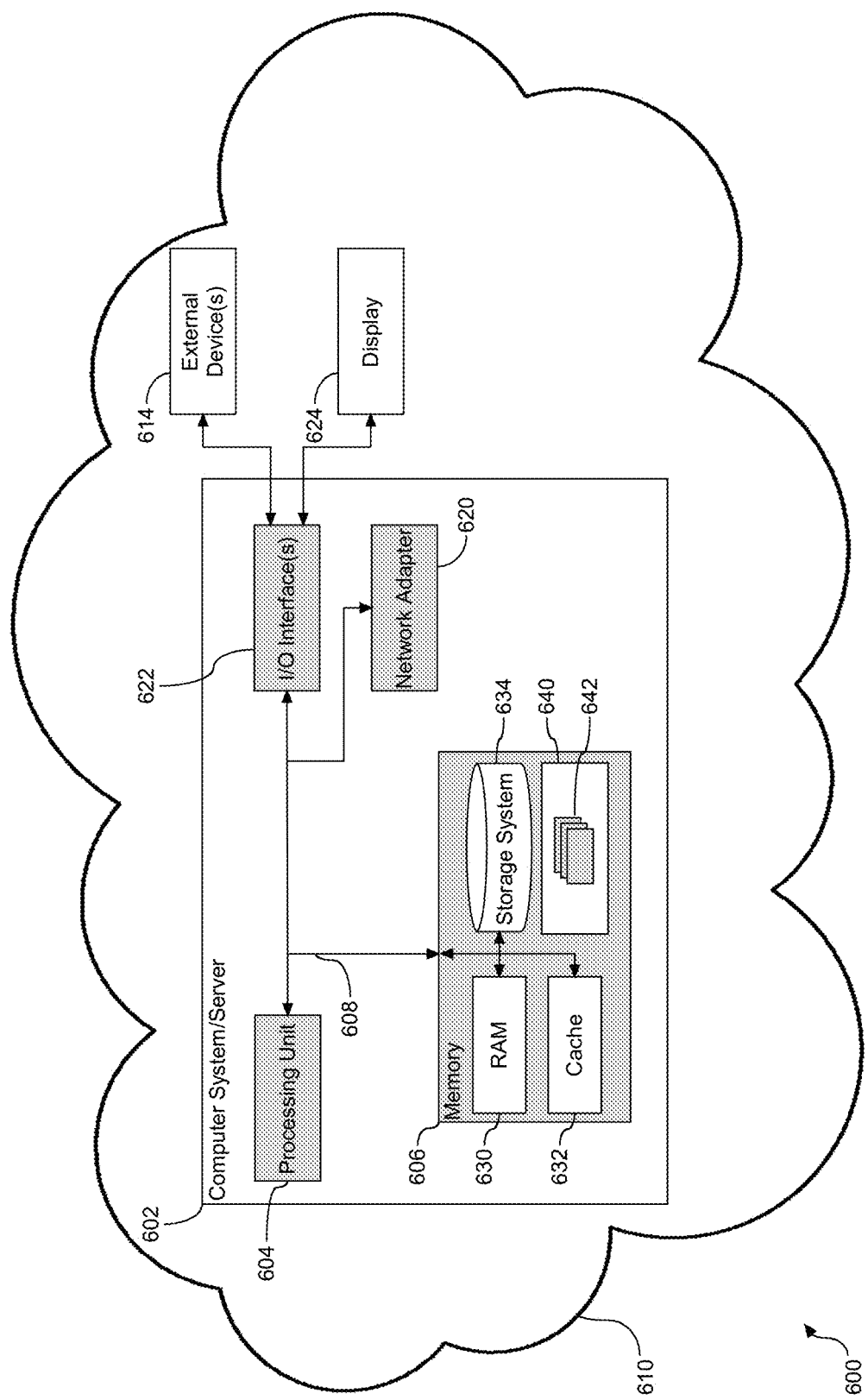
FIG. 6 depicts a block diagram illustrating an example of a computer system/server of a cloud based support system, to implement the system and processes described above with respect to FIGS. 1-5.

As shown in FIG. 6, host (602) is shown in the form of a general-purpose computing device. The components of host (602) may include, but are not limited to, one or more processors or processing units (604), e.g., hardware processors, a system memory (606), and a bus (608) that couples various system components including system memory (606) to processor (604). Bus (608) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host (602) typically includes a variety of computer system readable media. Such media may be any available media that is accessible by host (602) and it includes both volatile and non-volatile media, removable and non-removable media.

Memory (606) can include computer system readable media in the form of volatile memory, such as random access memory (RAM) (630) and/or cache memory (632). By way of example only, storage system (634) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (608) by one or more data media interfaces.

Program/utility (640), having a set (at least one) of program modules (642), may be stored in memory (606) by way of example, and not limitation, as well as an operating system, one or more application programs, other program modules, and program data. Each of the operating systems, one or more application programs, other program modules, and program data or some combination thereof, may include an implementation of a networking environment. Program modules (642) generally carry out the functions and/or methodologies of embodiments to train a ML model and leverage the ML model to classify micro-services with respect to applicable compliance requirements. For example, the set of program modules (642) may include the tools (152), (154), (156), and (158) as described in FIG. 1.

Host (602) may also communicate with one or more external devices (614), such as a keyboard, a pointing device, etc.; a display (624); one or more devices that enable a user to interact with host (602); and/or any devices (e.g., network card, modem, etc.) that enable host (602) to communicate with one or more other computing devices. Such communication can occur via Input/Output (I/O) interface(s) (622). Still yet, host (602) can communicate with one or more networks such as a local area network (LAN), a general wide area network (WAN), and/or a public network (e.g., the Internet) via network adapter (620). As depicted, network adapter (620) communicates with the other components of host (602) via bus (608). In an embodiment, a plurality of nodes of a distributed file system (not shown) is in communication with the host (602) via the I/O interface (622) or via the network adapter (620). It should be understood that although not shown, other hardware and/or software components could be used in conjunction with host (602). Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory (606), including RAM (630), cache (632), and storage system (634), such as a removable storage drive and a hard disk installed in a hard disk drive.

Computer programs (also called computer control logic) are stored in memory (606). Computer programs may also be received via a communication interface, such as network adapter (620). Such computer programs, when run, enable the computer system to perform the features of the present embodiments as discussed herein. In particular, the computer programs, when run, enable the processing unit (604) to perform the features of the computer system. Accordingly, such computer programs represent controllers of the computer system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments.

In an embodiment, host (602) is a node of a cloud computing environment. As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 7:
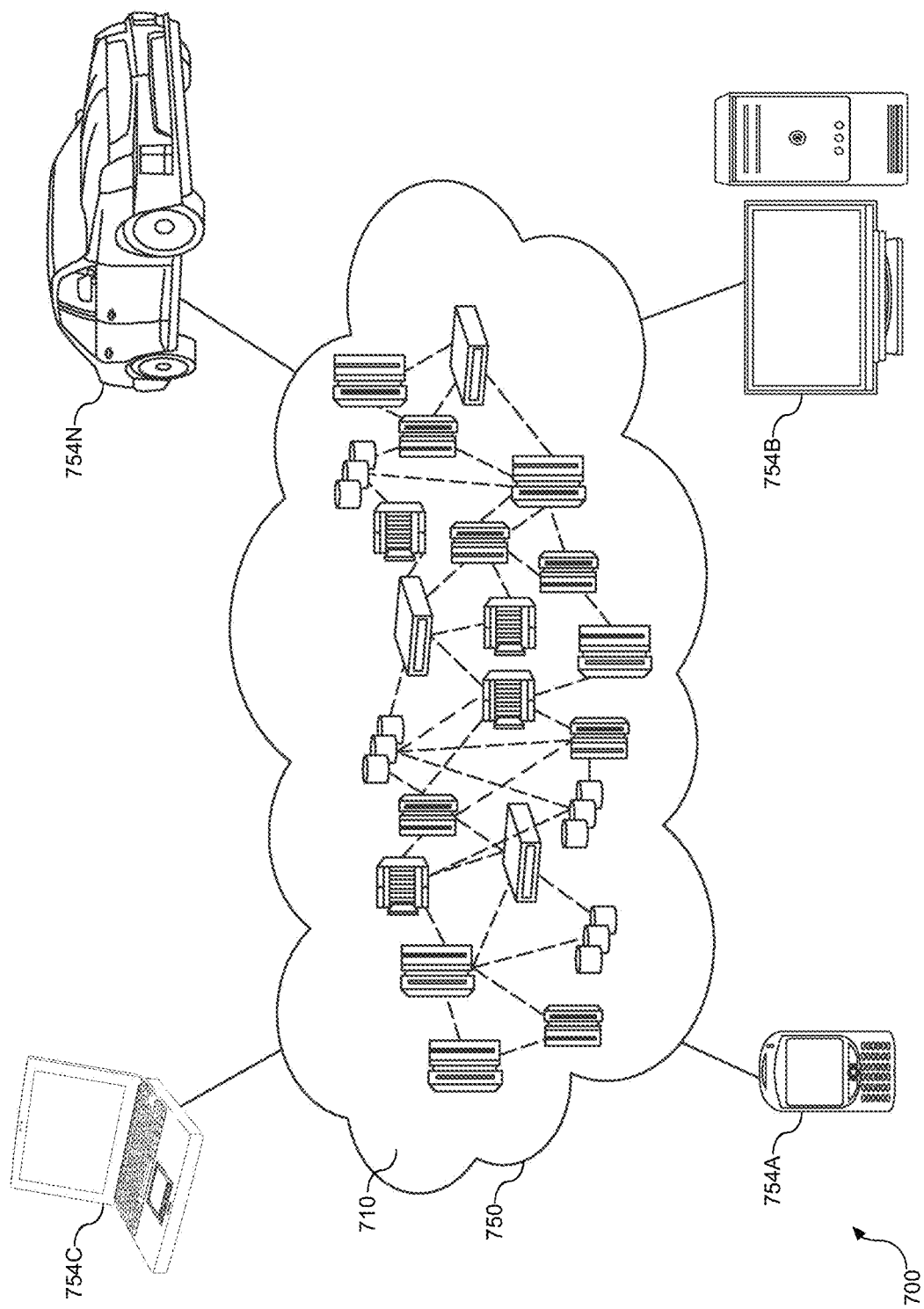
FIG. 7 depicts a block diagram illustrating a cloud computer environment.

Referring now to FIG. 7, an illustrative cloud computing network (700). As shown, cloud computing network (700) includes a cloud computing environment (750) having one or more cloud computing nodes (710) with which local computing devices used by cloud consumers may communicate. Examples of these local computing devices include, but are not limited to, personal digital assistant (PDA) or cellular telephone (754A), desktop computer (754B), laptop computer (754C), and/or automobile computer system (754N). Individual nodes within nodes (710) may further communicate with one another. They may be grouped (not shown) physically or virtually, in one or more networks, such as Private, Community, Public, or Hybrid clouds as described hereinabove, or a combination thereof. This allows cloud computing environment (700) to offer infrastructure, platforms and/or software as services for which a cloud consumer does not need to maintain resources on a local computing device. It is understood that the types of computing devices (754A-N) shown in FIG. 7 are intended to be illustrative only and that the cloud computing environment (750) can communicate with any type of computerized device over any type of network and/or network addressable connection (e.g., using a web browser).

Figure 8:
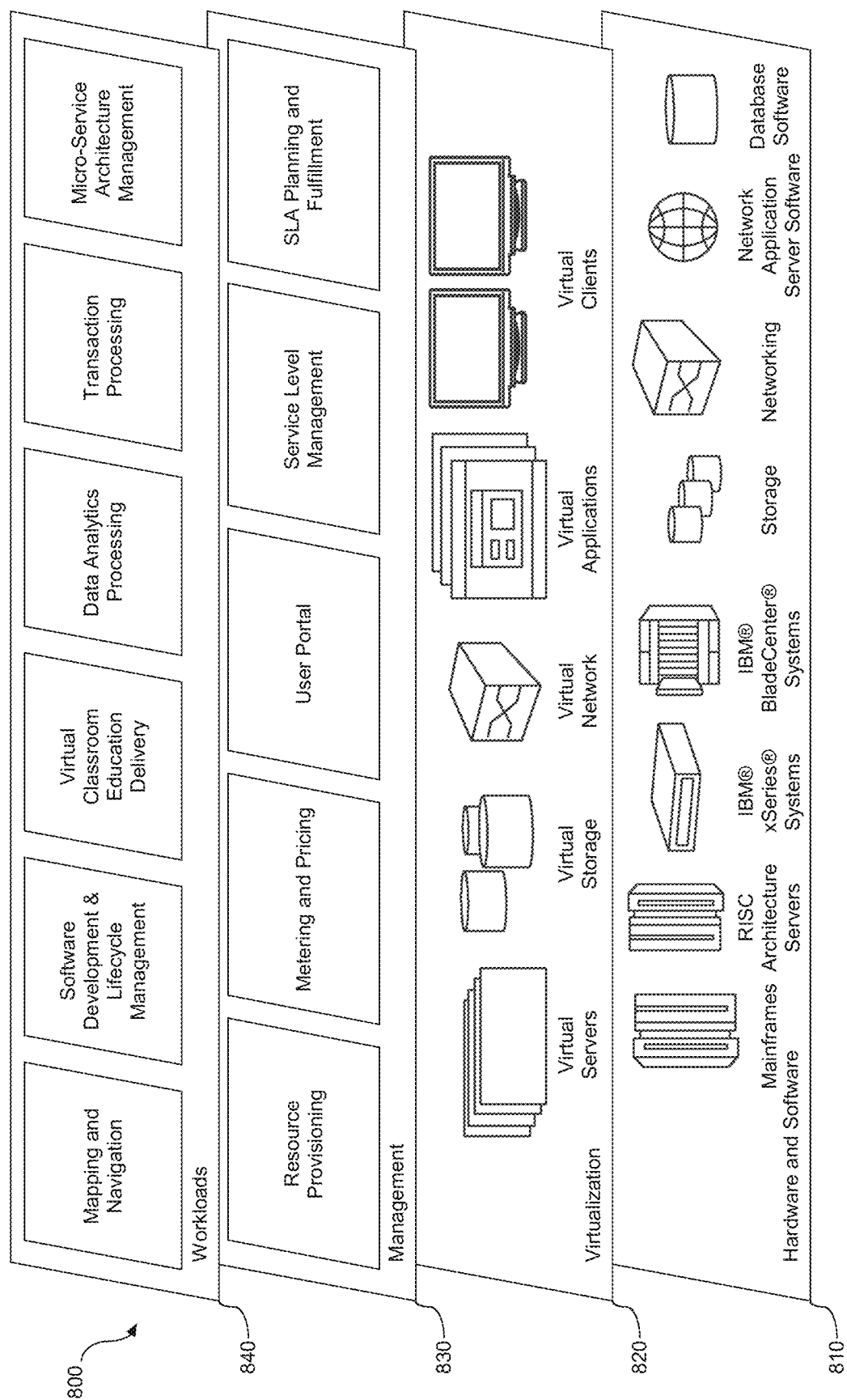
FIG. 8 depicts a block diagram illustrating a set of functional abstraction model layers provided by the cloud computing environment.

Referring now to FIG. 8, a set of functional abstraction layers (800) provided by the cloud computing network of FIG. 7 is shown. It should be understood in advance that the components, layers, and functions shown in FIG. 8 are intended to be illustrative only, and the embodiments are not limited thereto. As depicted, the following layers and corresponding functions are provided: hardware and software layer (810), virtualization layer (820), management layer (830), and workload layer (840).

The hardware and software layer (810) includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide.)

Virtualization layer (820) provides an abstraction layer from which the following examples of virtual entities may be provided: virtual servers; virtual storage; virtual networks, including virtual private networks; virtual applications and operating systems; and virtual clients.

In one example, management layer (830) may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provides cost tracking as resources are utilized within the cloud computing environment, and billing or invoicing for consumption of these resources. In an example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides pre-arrangement for, and procurement of, cloud computing resources for which a future requirement is anticipated in accordance with an SLA.

Workloads layer (840) provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and micro-service compliance requirement identification.

While particular embodiments of the present embodiments have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of an artificial intelligence platform to train a ML model and leverage the trained model to classify micro-services with respect to compliance requirements.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. Accordingly, the scope of protection of the embodiments is limited only by the following claims and their equivalents.

What is claimed is:

1. A computer system comprising:
a processing unit operatively coupled to memory; and
an artificial intelligence (AI) platform in communication with the processing unit, comprising:
a machine learning (ML) manager to:
train a ML model to learn an association between one or more compliance requirements and one or more features of a micro-service training dataset; and
a classifier to leverage the trained ML model to determine a compliance requirement, including the classifier to:
receive a micro-service and
extract one or more features from the received micro-service; and
apply the one or more extracted features to the trained ML model; and
the trained ML model to predict an association between the micro-service and one or more of the compliance requirements as output, the prediction based on correlation of the one or more features extracted from the micro-service and the one or more features of the one or more micro-service training dataset.

2. The computer system of claim 1, further comprising a placement manager to identify a placement location of the micro-service within an information technology infrastructure, wherein the placement location satisfies one or more operating protocols of the one or more compliance requirements associated with the micro-service.

3. The computer system of claim 2, further comprising the placement manager to place the micro-service into the identified placement location.

4. The computer system of claim 1, further comprising the ML manager to:
capture the one or more compliance requirements from the one or more micro-service training datasets; and
for each of the micro-service training datasets, extract the one or more features and associate the extracted one or more features with the captured one or more compliance requirements.

5. The computer system of claim 1, further comprising the AI platform to apply active learning to the trained ML model to assess accuracy of the prediction.

6. The computer system of claim 1, wherein:
the AI platform further comprises a verification manager to verify accuracy of the prediction; and
the ML model, subject to verification of accuracy of the prediction by the verification platform, to:
capture one or more compliance requirements of the micro-service;
for the micro-service, extract one or more features and associate the extracted one or more features with the captured one or more compliance requirements; and
further train the ML model to learn the association between the captured one or more compliance requirements and the extracted one or more features of the micro-service.

7. A computer program product comprising a computer readable storage medium having a program code embodied therewith, the program code executable by a processor to:
train a machine learning (ML) model, including to learn an association between one or more compliance requirements and one or more features of one or more micro-service training datasets:
extract one or more features from a micro-service;
apply the one or more features extracted from the micro-service to the trained ML model; and
leverage the trained ML model to predict an association between the micro-service and one or more of the compliance requirements based on correlation of the one or more features extracted from the micro-service and one or more features extracted from the one or more micro-service training datasets.

8. The computer program product of claim 7, further comprising program code executable to identify a placement location of the micro-service within an information technology infrastructure, wherein the placement location satisfies operating protocols of the one or more compliance requirements associated with the micro-service.

9. The computer program product of claim 8, further comprising program code executable to place the micro-service into the identified placement location.

10. The computer program product of claim 8, further comprising the program code executable by the processor to train the ML model to:
capture the one or more compliance requirements from the one or more micro-service training datasets; and
for each of the micro-service training datasets, extract the one or more features and associate the extracted one or more features with the captured one or more compliance requirements.

11. The computer program product of claim 7, further comprising program code executable to apply active learning to the trained ML model to assess accuracy of the prediction.

12. The computer program product of claim 7, further comprising program code executable to:
verify accuracy of the prediction;
capture one or more compliance requirements of the micro-service;
extract one or more features for the micro-service and associate the extracted one or more features with the captured one or more compliance requirements; and
train the ML model to learn the association between the captured one or more compliance requirements and the extracted one or more features of the micro-service.

13. A computer-implemented method, comprising:
training a machine learning (ML) model using artificial intelligence, including learning an association between one or more compliance requirements and one or more features of one or more micro-service training datasets:
receiving a micro-service;
extracting one or more features from the received micro-service; and leveraging the trained ML model to determine compliance requirements the received micro-service, including applying the one or more features extracted from the received micro-service to the trained ML model to predict an association between the micro-service and one or more of the compliance requirements based on correlation of the one or more features extracted from the micro-service and one or more features extracted from the one or more micro-service training datasets.

14. The computer-implemented method of claim 13, further comprising identifying a placement location of the micro-service within an information technology infrastructure, wherein the placement location satisfies operating protocols of the one or more compliance requirements associated with the micro-service.

15. The computer-implemented method of claim 14, further comprising placing the micro-service into the identified placement location.

16. The computer-implemented method of claim 14, training the ML model using artificial intelligence further comprises:
  capturing the one or more compliance requirements from the one or more micro-service training datasets; and
  for each of the micro-service training datasets, extracting the one or more features and associating the extracted one or more features with the captured one or more compliance requirements.

17. The computer-implemented method of claim 14, further comprising applying artificial intelligence for identifying the placement location.

18. The computer-implemented method of claim 13, further comprising applying active learning to the trained ML model to assess accuracy of the prediction.

19. The computer-implemented method of claim 13, further comprising:
  verifying the prediction as accurate;
  capturing one or more compliance requirements of the micro-service;
  extracting one or more features from the micro-service and associating the extracted one or more features with the captured one or more compliance requirements; and
  training the ML model to learn the association between the captured one or more compliance requirements and the extracted one or more features of the micro-service.

\* \* \* \* \*